US010567743B1

(12) United States Patent
Giguere et al.

(10) Patent No.: US 10,567,743 B1
(45) Date of Patent: Feb. 18, 2020

(54) SEE-THROUGH BASED DISPLAY METHOD AND SYSTEM FOR SIMULATORS

(71) Applicant: CAE INC., Saint-Laurent (CA)

(72) Inventors: Ghislain Giguere, Saint-Laurent (CA); David Kovats, Saint-Laurent (CA); Mathieu Gagnon, Saint-Laurent (CA); Alexandre Millette, Saint-Laurent (CA)

(73) Assignee: CAE INC., Saint-Laurent, Quebec (CA)

(*) Notice: Subject to any disclaimer, the term of this patent is extended or adjusted under 35 U.S.C. 154(b) by 0 days.

(21) Appl. No.: 16/139,117

(22) Filed: Sep. 24, 2018

(51) Int. Cl.
| | |
|---|---|
| *H04N 13/361* | (2018.01) |
| *H04N 13/332* | (2018.01) |
| *H04N 13/383* | (2018.01) |
| *G06T 19/00* | (2011.01) |
| *H04N 13/398* | (2018.01) |
| *G02B 27/22* | (2018.01) |
| *G02B 27/26* | (2006.01) |
| *G02B 27/01* | (2006.01) |

(52) U.S. Cl.
CPC ....... *H04N 13/361* (2018.05); *G02B 27/0172* (2013.01); *G02B 27/2264* (2013.01); *G02B 27/26* (2013.01); *G06T 19/006* (2013.01); *H04N 13/332* (2018.05); *H04N 13/383* (2018.05); *H04N 13/398* (2018.05); *G02B 2027/014* (2013.01); *G02B 2027/0134* (2013.01); *H04N 2213/001* (2013.01)

(58) Field of Classification Search
CPC .. H04N 13/361; H04N 13/332; H04N 13/398; H04N 13/383; H04N 2213/001; G02B 27/0172; G02B 27/2264; G02B 27/0179; G02B 27/26; G02B 2027/0134; G02B 2027/0187; G02B 2027/0136; G02B 2027/0138; G02B 2027/014; G06T 19/006

See application file for complete search history.

(56) References Cited

U.S. PATENT DOCUMENTS

| | | | |
|---|---|---|---|
| 6,814,578 B2 | 11/2004 | Vorst | |
| 8,831,796 B2 | 9/2014 | Samuthirapandian et al. | |
| 8,982,472 B2 | 3/2015 | Lvovskiy et al. | |
| 9,102,055 B1 | 8/2015 | Konolige et al. | |
| 9,480,907 B2* | 11/2016 | Benko | A63F 13/00 |
| 9,560,341 B2 | 1/2017 | Nakamura | |

(Continued)

FOREIGN PATENT DOCUMENTS

| | | |
|---|---|---|
| CA | 2950429 A1 | 12/2015 |
| EP | 2166527 B1 | 8/2016 |
| WO | 2017124168 A1 | 7/2017 |

*Primary Examiner* — James M Pontius
(74) *Attorney, Agent, or Firm* — Fasken Martineau Dumoulin LLP

(57) ABSTRACT

A display system for a simulator comprising: a main display for displaying a simulated scene, the first display being positionable away from a user; a see-through display for displaying a portion of the simulated scene, the see-through display being wearable by the user; a filter for filtering a portion of a field of view of the user; and a control unit configured for: receiving environment images, the environment images comprising a first set of images of the simulated scene, a second set of images of the simulated scene and a third set of images of at least a portion of the simulated scene; displaying the first and second set of images on the first display; and displaying the third set of images on the see-through display.

20 Claims, 6 Drawing Sheets

(56) References Cited

U.S. PATENT DOCUMENTS

| | | | |
|---|---|---|---|
| 9,583,019 B1 | 2/2017 | Schwartz et al. | |
| 9,726,896 B2* | 8/2017 | von und zu Liechtenstein | G02B 27/0179 |
| 10,068,378 B2* | 9/2018 | Cabanier | G06F 3/012 |
| 10,198,846 B2* | 2/2019 | Carr | G06T 13/80 |
| 10,430,559 B2* | 10/2019 | Anantharaman | G06F 3/011 |
| 2012/0327527 A1 | 12/2012 | Jarvis et al. | |
| 2016/0014403 A1 | 1/2016 | Stroetmann | |
| 2016/0035139 A1* | 2/2016 | Fuchs | G02B 27/017 345/633 |
| 2017/0102545 A1* | 4/2017 | Hua | H04N 13/204 |
| 2017/0103576 A1* | 4/2017 | DeFaria | G06F 3/0487 |
| 2017/0110023 A1 | 4/2017 | Bell et al. | |
| 2017/0155893 A1 | 6/2017 | Mather et al. | |
| 2017/0266554 A1* | 9/2017 | Marks | A63F 13/352 |
| 2017/0269685 A1* | 9/2017 | Marks | A63F 13/533 |
| 2017/0269713 A1* | 9/2017 | Marks | A63F 13/335 |
| 2018/0034867 A1* | 2/2018 | Zahn | G02B 27/0172 |
| 2018/0046363 A1* | 2/2018 | Miller | G06F 3/017 |
| 2018/0061128 A1* | 3/2018 | Cabanier | G09G 5/12 |
| 2018/0261166 A1* | 9/2018 | Seibert | G02B 27/0172 |
| 2018/0293041 A1* | 10/2018 | Harviainen | G06F 3/147 |
| 2019/0034765 A1* | 1/2019 | Kaehler | G06F 3/011 |
| 2019/0272138 A1* | 9/2019 | Krauss | G06F 3/013 |

\* cited by examiner

SEE-THROUGH BASED DISPLAY METHOD AND SYSTEM FOR SIMULATORS

TECHNICAL FIELD

The present invention relates to the field of simulators, and more particularly to the field of display methods and systems for simulators.

BACKGROUND

Flying an aircraft requires a good understanding, by the pilot, of his position in space with respect to the exterior environment and obstacles. Visually, this information comes from the pilot's perception of depth in the scene. This perception of depth is naturally available in real-world training thanks to human stereoscopic vision. However, the perception of depth is usually limited in a simulator environment used for training pilots.

In order to improve the situational awareness provided by a simulator environment, visual display technology offering a very wide field of view (FoV) are used to provide an immersive visual environment. However such wide FoV displays usually cannot provide a true stereoscopic depth perception when the simulator is configured for training two users and can only render 2D images onto a flat surface. In addition, such displays usually have a large physical footprint.

Therefore, there is a need for an improved method and system for displaying images in a simulator.

SUMMARY

According to a first broad aspect, there is provided a display system for a simulator comprising: a first display for displaying a simulated scene, the first display being positionable away from a user; a second display for displaying a portion of the simulated scene, the second display being wearable by the user; at least one camera for capturing video images along a line of view of the user; a filter for filtering a portion of a field of view of the user; and a control unit configured for: receiving environment images, the environment images comprising a first set of images of the simulated scene, a second set of images of the simulated scene and at least a third set of images of a portion of the simulated scene; displaying the first and second set of images on the first display; generating augmented reality images based on the video images and the at least a third set of images; and displaying the augmented reality images on the second display.

In one embodiment, the first set of images comprises images of the simulated scene according to a first point of view and the second set of images comprises images of the simulated scene according to a second and different point of view.

In one embodiment, the control unit is further configured for receiving simulation data and generating the first and second sets of images using the received simulation data.

In one embodiment, the augmented reality images comprise the video images to which the at least one third set of images is added.

In one embodiment, the control unit is further configured for generating the at least one third set of images using the line of view.

In one embodiment, the display system further comprises a tracking unit configured for tracking the line of view of the user.

In one embodiment, the tracking unit is configured for tracking a position and an orientation of a head of the user and the control unit is configured for determining the line of view using the position and the orientation of the head.

In one embodiment, the second display is configured for displaying stereoscopic augmented reality images.

In one embodiment, the second display comprises a binocular head-mounted display.

In one embodiment, the first display is configured for displaying monoscopic images.

In one embodiment, the first display comprises a rear projection screen and a projector.

In one embodiment, the filter comprises a shutter device wearable by the user adjacent to the second display, the shutter device being configured for selectively obstructing a portion of a field of view of the user; and the control unit is configured for sequentially displaying the first and second set of images on the first display and synchronizing the shutter device with the sequential display of the first and second set of images to selectively prevent the user from seeing at least a section of the first display during display of the second set of images on the first display.

In one embodiment, the shutter device is configured for selectively blocking at least a far peripheral vision of the user.

In one embodiment, the shutter device and the second display are mounted on a head-mounted display.

In one embodiment, the shutter device comprises a liquid crystal shutter.

In one embodiment, the filter is a passive filter.

In one embodiment, the passive filter comprises a polarization glass device for allowing the user to see images having a given polarization, the images of the first set having the given polarization and the images of the second set having a polarization different from the given polarization for preventing the user from seeing the second images through the polarization glass device.

In one embodiment, the passive filter comprises a wavelength filter device for allowing the user to see images having a given wavelength range, the images of the first set having the given wavelength range and the images of the second set having a wavelength range different form the given wavelength range for preventing the user from seeing the second images through the wavelength filter device.

According to another broad aspect, there is provided a simulator comprising: physical elements mocking elements of a simulated system; and the above-described display system.

According to a further broad aspect, there is provided a computer-implemented method for displaying images in a simulator, comprising: receiving scene images of a simulated scene, the scene images comprising a first set of images of the simulated scene, a second set of images of the simulated scene and at least one third set of images of a portion of the simulated scene; receiving video images captured by at least one camera along a line of view of a user; displaying the first and second set of images on a first display positionable away from a user; generating augmented reality images based on the video images and the at least one third set of images, the video images being captured by the at least one camera along a line of view of the user; displaying the augmented reality images on a second display, the second display being wearable by the user; and filtering a portion of a field of view of the user.

In one embodiment, the first set of images comprises images of the simulated scene according to a first point of view and the second set of images comprises images of the simulated scene according to a second and different point of view.

In one embodiment, the method further comprises receiving simulation data and generating the first and second sets of images using the received simulation data.

In one embodiment, the augmented reality images comprise the video images to which the at least one third set of images is added.

In one embodiment, the method further comprises generating the at least one third set of images using the line of view.

In one embodiment, the method further comprises tracking the line of view of the user.

In one embodiment, the step of tracking the line of view of the user comprises tracking a position and an orientation of a head of the user, the method further comprising determining the line of view using the position and the orientation of the head.

In one embodiment, the step of displaying the augmented reality images comprises displaying stereoscopically the augmented reality images.

In one embodiment, the step of displaying the augmented reality images comprises displaying the augmented reality images on a binocular head-mounted display.

In one embodiment, the step of displaying the first and second set of images on the first display displaying monoscopically the first and second set of images.

In one embodiment, the step of displaying monoscopically the first and second set of images comprises projecting the first and second sets of images on a rear projection screen.

In one embodiment, the step of displaying the first and second set of images on the first display comprises sequentially displaying the first and second set of images on the first display; and the step of filtering the portion of the field of view of the user comprises selectively obstructing the portion of the field of view of the user in synchronization with the sequential display of the first and second sets of images, thereby selectively preventing the user from seeing at least a section of the first display during display of the second set of images on the first display.

In one embodiment, the step of selectively obstructing a portion of a field of view of the user is performed by synchronizing a shutter device with the sequential display of the first and second sets of images, the shutter device being wearable by the user adjacent to the second display.

In one embodiment, the step of selectively obstructing a portion of a field of view of the user comprises selectively blocking at least a far peripheral vision of the user.

In one embodiment, the images of the first set have a given polarization and the images of the second set have a polarization different from the given polarization, said filtering comprising allowing the user to see the first images having the given polarization and preventing the user from seeing the second images having the polarization different from the given polarization.

In one embodiment, the images of the first set have a first wavelength bandwidth and the images of the second set have a second wavelength bandwidth different from the first wavelength bandwidth, said filtering comprising allowing the user to see the first images having the first given wavelength range and preventing the user from seeing the second images having the second wavelength range.

According to still another broad aspect, there is provided a computer program product for displaying images in a simulator, the computer program product comprising a computer readable memory storing computer executable instructions thereon that when executed by a computer perform the steps of the above-described method.

According to still a further broad aspect, there is provided a display system for a simulator comprising: a main display for displaying a simulated scene, the first display being positionable away from a user; a see-through display for displaying a portion of the simulated scene, the see-through display being wearable by the user; a filter for filtering a portion of a field of view of the user; and a control unit configured for: receiving environment images, the environment images comprising a first set of images of the simulated scene, a second set of images of the simulated scene and a third set of images of at least a portion of the simulated scene; displaying the first and second set of images on the first display; and displaying the third set of images on the see-through display.

In one embodiment, the first set of images comprises images of the simulated scene according to a first point of view and the second set of images comprises images of the simulated scene according to a second and different point of view.

In one embodiment, the control unit is further configured for receiving simulation data and generating the first and second sets of images using the received simulation data.

In one embodiment, the control unit is further configured for generating the third set of images using the line of view.

In one embodiment, the display system further comprises a tracking unit configured for tracking the line of view of the user.

In one embodiment, the tracking unit is configured for tracking a position and an orientation of a head of the user and the control unit is configured for determining the line of view using the position and the orientation of the head.

In one embodiment, the see-through display is configured for displaying stereoscopic images.

In one embodiment, the second display comprises a binocular head-mounted see-through display.

In one embodiment, the main display is configured for displaying monoscopic images.

In one embodiment, the main display comprises a rear projection screen and a projector.

In one embodiment, the filter comprises a shutter device wearable by the user adjacent to the second display, the shutter device being configured for selectively obstructing a portion of a field of view of the user; and the control unit is configured for sequentially displaying the first and second set of images on the first display and synchronizing the shutter device with the sequential display of the first and second set of images to selectively prevent the user from seeing at least a section of the first display during display of the second set of images on the first display.

In one embodiment, the shutter device is configured for selectively blocking at least a far peripheral vision of the user.

In one embodiment, the shutter device and the see-through display are mounted on a head-mounted display.

In one embodiment, the shutter device comprises a liquid crystal shutter.

In one embodiment, the filter is a passive filter.

In one embodiment, the passive filter comprises a polarization glass device for allowing the user to see images having a given polarization, the images of the first set having the given polarization and the images of the second set having a polarization different from the given polarization for preventing the user from seeing the second images through the polarization glass device.

In one embodiment, the passive filter comprises a wavelength filter device for allowing the user to see images having a given wavelength range, the images of the first set having the given wavelength range and the images of the second set having a wavelength range different form the given wavelength range for preventing the user from seeing the second images through the wavelength filter device.

According to still another embodiment, there is provided a simulator comprising: physical elements mocking elements of a simulated system; and the above-described display system.

According to still a further embodiment, there is provided a computer-implemented method for displaying images in a simulator, comprising: receiving scene images of a simulated scene, the scene images comprising a first set of images of the simulated scene, a second set of images of the simulated scene and a third set of images corresponding to at least a portion of the scene; displaying the first and second set of images on a main display positionable away from a user; displaying the third set of images on a see-through display, the see-through display being wearable by the user; and filtering a portion of a field of view of the user.

In one embodiment, the first set of images comprises images of the simulated scene according to a first point of view and the second set of images comprises images of the simulated scene according to a second and different point of view.

In one embodiment, the method further comprises receiving simulation data and generating the first and second sets of images using the received simulation data.

In one embodiment, the method further comprises generating the third set of images using the line of view.

In one embodiment, the method further comprises tracking the line of view of the user.

In one embodiment, the step of tracking the line of view of the user comprises tracking a position and an orientation of a head of the user, the method further comprising determining the line of view using the position and the orientation of the head.

In one embodiment, the step of displaying the third set of images comprises displaying stereoscopically the third set of images.

In one embodiment, the step of displaying the third set of images comprises displaying the third set of images on a binocular head-mounted see-through display.

In one embodiment, the step of displaying the first and second set of images on the main display displaying monoscopically the first and second set of images.

In one embodiment, the step of displaying monoscopically the first and second set of images comprises projecting the first and second sets of images on a rear projection screen.

In one embodiment, the step of displaying the first and second set of images on the first display comprises sequentially displaying the first and second set of images on the first display; and the step of filtering the portion of the field of view of the user comprises selectively obstructing the portion of the field of view of the user in synchronization with the sequential display of the first and second sets of images, thereby selectively preventing the user from seeing at least a section of the first display during display of the second set of images on the first display.

In one embodiment, the step of selectively obstructing a portion of a field of view of the user is performed by synchronizing a shutter device with the sequential display of the first and second sets of images, the shutter device being wearable by the user adjacent to the see-through display.

In one embodiment, the step of selectively obstructing a portion of a field of view of the user comprises selectively blocking at least a far peripheral vision of the user.

In one embodiment, the images of the first set have a given polarization and the images of the second set have a polarization different from the given polarization, said filtering comprising allowing the user to see the first images having the given polarization and preventing the user from seeing the second images having the polarization different from the given polarization.

In one embodiment, the images of the first set have a first wavelength bandwidth and the images of the second set have a second wavelength bandwidth different from the first wavelength bandwidth, said filtering comprising allowing the user to see the first images having the first given wavelength range and preventing the user from seeing the second images having the second wavelength range.

According to still another broad aspect, there is provided a computer program product for displaying images in a simulator, the computer program product comprising a computer readable memory storing computer executable instructions thereon that when executed by a computer perform the steps of the above-described method.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
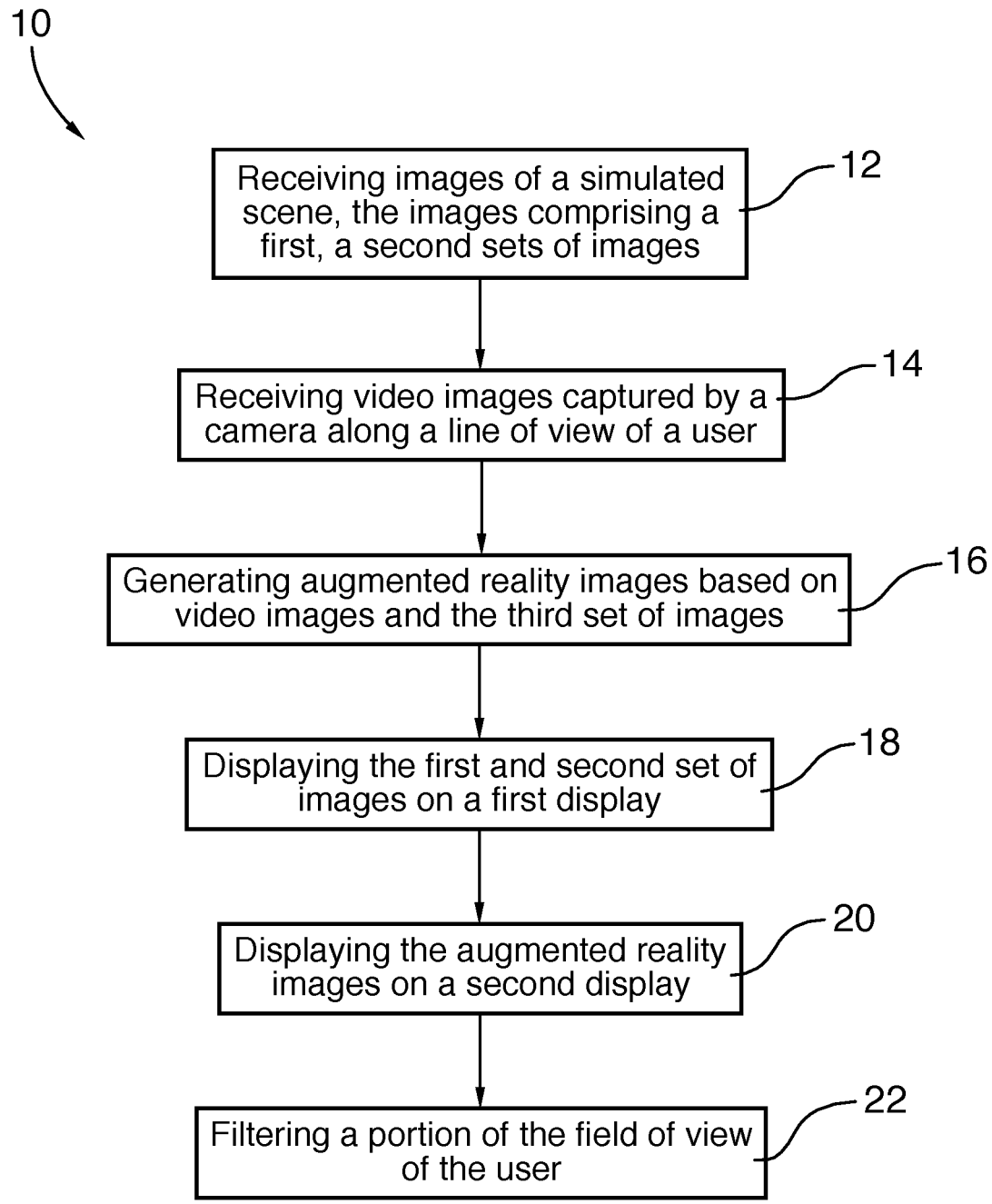
FIG. 1 is a flow chart of a method for displaying images in a simulator comprising a wearable display for displaying augmented reality images thereon, the reality images being generated using images recorded by a camera, in accordance with an embodiment.

There is described a method and system for displaying images in a simulator. The simulator may be used for concurrently training two users such as a pilot and a copilot of an aircraft. The simulator comprises a main display on which images of a scene are displayed to the two users who each have a respective position relative to the main display. Each user is provided with a second display on which respective images are displayed. For example, the images displayed on a wearable display may correspond to a section of the scene displayed on the main display according to the point of view of the respective user. Each user is further provided with a respective filter adapted to partially filter the field of view of the user outside of the wearable display.

In one embodiment, the second display is wearable and comprises a non-transparent or non-translucent display. In this case, at least one camera captures images of what the user would see if he would not wear the wearable display, i.e. images of the physical elements of the simulator surrounding the user according to the line or point of view of the user. Augmented reality images are then created using the images captured by the camera and at least a portion of the images displayed on the main display. The created images are then displayed on the wearable display.

In another embodiment, the second or wearable display comprises a see-through display. In this case, the users are provided with no camera and at least a portion of the images displayed on the main display is displayed on the wearable display.

In one embodiment, the filters are active filters such as shutters. In this case, two sets of images are displayed on the main display. The first set of images comprises images of a scene suitable for being seen according to the point of view of the first user. The second set of images comprises images of the same scene suitable for being seen according to the point of view of the second user. The first and second sets of images are displayed sequentially on the first display, i.e. images of the first set and images of the second set are displayed on the first display in an alternating manner. The active filters are used for blocking at least a portion of the field of view of the users in a synchronized manner with the sequential display of the first and second sets of images. When an image of the first set is displayed on the first display, the shutter of the first user is open so that the first user may see the image displayed on the first display in addition to the image displayed on its wearable display while the shutter of the second user is closed so that the second user cannot see the image displayed on the first display and may only see the image displayed on its wearable display. Similarly, when an image of the second set is displayed on the first display, the shutter of the second user is open so that the second user may see the image displayed on the first display in addition to the image displayed on its wearable display while the shutter of the first user is closed so that the first user cannot see the image displayed on the first display and may only see the image displayed on its wearable display.

In another embodiment, the filters are passive filters. For example, the passive filters may be polarized glasses. In this case, the polarized glasses of the first user allows the first user to see images having a first polarization while preventing the first user from seeing images having a second and different polarization. The polarized glasses of the second user allows the second user to see images having the second polarization while preventing the second user from seeing images having the first polarization. First images having the first polarization and second images having the second polarization are displayed on the first display. In one embodiment, the first and second images are displayed concurrently on the first display. In another embodiment, the first and second images are displayed sequentially. It should be understood that the first images having the first polarization are adequate for the first user, e.g. they may be suitable for being seen according to the point of view of the first user, while the second images having the second polarization are adequate for the second user, e.g. they may be suitable for being seen according to the point of view of the second user.

In another example, the passive filters may comprise wavelength filters. In this case, the wavelength filter of the first user is adapted to allow propagation of light having a wavelength comprised in a first range of wavelength, i.e. a first wavelength bandwidth, while the wavelength filter of the second user is adapted to allow propagation of light having a wavelength comprised in a second and different range of wavelength, ie.e a second wavelength bandwidth. First images having image data within the first wavelength bandwidth and second images having image data within the second wavelength bandwidth are concurrently displayed on the first display. While the first and second images are concurrently displayed on the first display, the first user only sees the first images since his wavelength filter cuts out the wavelengths corresponding to the second images and the second user only sees the second images displayed on the first display since its wavelength filter cuts out the wavelengths corresponding to the first images.

FIG. 1 illustrates one embodiment of a method 10 for displaying images in a simulator. In this method, the users are provided with active filters and non-see-through wearable displays. As described in more detail below, the simulator is configured for concurrently training two users such as a pilot and a copilot. However, it should be understood that the simulator may be used by a single user or more than two users.

The method 10 is executed by a computer machine provided with at least one processor or processing unit, a memory and communication means.

At step 12, scene images, i.e. images of a scene to be displayed to a user, are received. The scene images offer a representation of the simulation environment to be displayed to the user(s) of the simulator. For example, the scene images may be simulated images representing what a pilot of an aircraft would see while flying.

The scene images comprise three sets of images. It should be understood that a set of images comprises images which are timely ordered so as to be displayed according to a temporal order to form a video.

In one embodiment, the three sets of images comprise images of a same scene. For example, the first set of images comprises images of a scene suitable for being seen according to a first point of view. The second set of images comprises images of the same scene suitable for being seen according to a second and different point of view. For example, when the simulator is configured for concurrently train two users such as a pilot and a copilot who are seated one next to the other, the first set of images may comprise images simulated for being seen according to the point of view of the pilot while the second set of images may comprise images simulated for being seen according to the point of view of the copilot. The third set of images comprises images of at least a portion of the scene. It should be understood that the third set of images may also comprise images different from the first and second sets of images.

In another embodiment, the third set of images may comprise two sets of images, i.e. a set of images according to the point of view of the left eye of the user and a further set of images according to the point of the right eye of the user.

In a further embodiment, the first and second sets of images may comprise images of different scenes. In this case, the third set of images comprise images of the same scene as that of the first or second set of images. For example, when the simulator is configured for concurrently train two users such as a pilot and a copilot, a different scene could be projected to the two users.

In one embodiment, an image of the third set is a portion of a corresponding image of the first or second set. For example, an image of the first set may represent a scene and an image of the third set may represent a portion or section of the same scene according to a given point of view. In an embodiment in which the third set of images comprises images for the left eye and the right eye, the third set of images comprises a set of images of the scene or a portion of the scene according to the point of view of the left eye and a set of corresponding images of the scene or a portion of the scene according to the point of view of the right eye.

In one embodiment, the first and second sets of images comprise monoscopic images. In the same or another embodiment, the third set of images comprises stereoscopic images.

In an embodiment in which the simulator is configured for training two users, the third set of images comprises two sets of images each for a respective user.

At step 14, video images captured by a camera are received. The video images are captured along the line of sight or line of view of the user, i.e. the camera substantially captures what the user sees. The line of view may be defined by a vector of which the direction corresponds to the direction along which the user looks at, and an origin point located such as a point located between the two eyes of the user or a point located on an eye of the user for example.

In one embodiment, the video images may be captured by two cameras, each recording respective images of the same scene according to a different point of view. For example, the first camera may capture images as seen by the left eye of the user and the second camera may capture images as seen by the right eye of the user.

In an embodiment in which the simulator is configured for training two users, two different sets of video images are received at step 14. The first set of images comprises video images captured along the line of view of the first user while the second set of images comprises video images captured along the line of view of the second user.

At step 16, augmented reality images are generated using the third set of images and the video images. An augmented reality image corresponds to a video image in which a simulated scene image is inserted.

In one embodiment, an augmented reality image corresponds to its respective video image captured by a camera, in which an image of the third set is inserted. The image of the third set replaces the representation of the first display within the video image, i.e. the first display within the video image is replaced by an image of the third set representing a portion of the simulated scene.

In an embodiment in which the simulator is configured for training two users, two sets of augmented reality images are generated at step 16, each one for a respective user.

At step 18, the first and second sets of images are displayed on a first display. In one embodiment, the first and second sets of images are concurrently displayed on the first display. In another embodiment, the first and second sets of images are sequentially displayed on the first display, i.e. images of the first set and images of the second set are displayed on the first display in an alternating manner. For example, at least a first image of the first set may be displayed during a first period of time, then at least a first image of the second set is displayed during a second period of time, etc. In one embodiment, the period of time during which an image of the first set is displayed is equal to the period of time during which an image of the second set is displayed.

For example, images of the first set may be displayed 30 times per second and images of the second set may also be displayed 30 times per second when the display rate is 60 Hz, each image being displayed during 16.67 ms. In another example, images of the first set may be displayed 60 times per second and images of the second set may also be displayed 60 times per second when the display rate is 120 Hz, each image being displayed during 8.33 ms.

At step 20, the augmented reality images are displayed on a second display concurrently to the sequential display of the first and second sets of images on the first display. As described below, the second display is wearable so as to be adjacent to the eyes of the user.

In an embodiment in which the simulator is configured for training two users, two sets of augmented reality images are generated and each set of augmented reality images is displayed on a respective second display for a respective user.

At step 22, a portion of the field of view of the user is filtered using an optical filter. The optical filter may be an active filter such as a shutter device. Alternatively, the optical filter may be a passive filter such as a polarization filter or a wavelength filter.

In an embodiment in which an active filter such as a shutter device is used, the portion of the field of view of the user is selectively blocked and the step 18 comprises sequentially displaying the first and second sets of images on the first display. The blocking of the portion of the field of view of the user is synchronized with the sequential display of the first and second sets of images. In one embodiment, the blocking of the field of view is synchronized with the display of the second set of images so that the field of view of the user is partially blocked while images of the second set are displayed. As a result, the whole field of view of the user is clear/unblocked when images of the first set are displayed. In another embodiment, the blocking of the field of view is synchronized with the display of the first set of images so that the field of view of the user is partially blocked when images of the first set are displayed. As a result, the whole field of view of the user is clear/unblocked when images of the second set are displayed.

In an embodiment in which the simulator is configured for training two users, the field of view of the users is partially blocked in an alternating manner. For example, the partial blocking of the field of view of the first user may be synchronized with the second set of images so that only the first images when displayed on the first display are within the field of view of the first user. The partial blocking of the field of view of the second user is synchronized with the display of the images of the first set so that only the images of the second set when displayed are within the field of view of the second user.

Therefore, when an image of the first set is displayed on the first display, the field of view of the first user is clear and the first user may see the augmented reality image displayed on his second display and at least a section of the first image displayed on the first display. On the other end, when an image of the first set is displayed, the field of view of the second user is partially blocked so that the second user may only see the augmented reality image displayed on his second display.

Similarly, when an image of the second set is displayed on the first display, the field of view of the second user is clear and the second user may see the augmented reality image displayed on his second display and at least a section of the second image displayed on the first display. On the other end, when an image of the second set is displayed, the field of view of the first user is partially blocked so that the first user may only see the augmented reality image displayed on his second display.

In an embodiment in which passive filtering is performed at step 22, the first and second sets of images are concurrently displayed on the first display at step 18. In one embodiment, polarization is filtered. In this case, the images of the first set have a first polarization while the images of the second set have a second and different polarization. The light coming from the portion of the field of view of the user is filtered so that only the light having the first polarization may reach the user's eyes and only the images of the first set may be seen by the user.

When the simulator is used for training two users, the light coming from the portion of the field of view of the first user is filtered so that only the light having the first polarization may reach the first user's eyes and only the images of the first set may be seen by the first user. Similarly, the light coming from the portion of the field of view of the second user is filtered so that only the light having the second polarization may reach the second user's eyes and only the images of the second set may be seen by the second user.

In another embodiment, wavelength is filtered. In this case, the images of the first set have a first range of wavelength associated thereto while the images of the second set have a second and different range of wavelength associated thereto. The light coming from the portion of the field of view of the user is filtered so that only light having a wavelength contained in the first range of wavelength may reach the user's eyes and only the images of the first set may be seen by the user.

When the simulator is used for training two users, the light coming from the portion of the field of view of the first user is filtered so that only light having a wavelength contained in the first range of wavelength may reach the first user's eyes and only the images of the first set may be seen by the first user. Similarly, the light coming from the portion of the field of view of the second user is filtered so that only light having a wavelength contained in the second range of wavelength may reach the second user's eyes and only the images of the second set may be seen by the second user.

In one embodiment, the first set of images comprises images of the simulated scene according to the point of view of the first user such as a pilot and the second set of images comprises images of the simulated scene according to a second and different point of view, i.e. the point of view of the second user such as a copilot.

In one embodiment, the method 10 further comprises receiving simulation data and generating the first and second sets of images using the simulation data. In one embodiment, the simulation data comprises at least visual information such as the information about the geometry of the elements in the world and position information such as the position or coordinates of the elements within the world. In one embodiment, the generation of the first and second sets of images is performed as a function of a position of the users relative to that of the first display while using the simulator. For example, the first set of images may be generated to suit the point of view of the first user, i.e. the first set of images is generated as a function the position of the head of the first user, while the second set of images may be generated to suit the point of view of the second user, i.e. the second set of images is generated as a function the position of the head of the second user.

In one embodiment, the generation of the first and second sets of images may be static, i.e. the position of the user is predefined or determined once, and the first and second sets of images are generated as a function of the respective unique position for their respective user.

In another embodiment, the generation of the first and second sets of images may be dynamic, i.e. the position of the user is tracked in real-time, and the first and second sets of images are generated as a function of the respective tracked position for their respective user.

Similarly, the method 10 may comprise a step of generating the third set of images for the user or each user when the simulator is configured for training more than one user. In this case, the third set of images is generated using the simulation data and the line of view of the user.

In one embodiment, the third set of images comprises stereoscopic images. In this case, the third set of images may comprise a first series of images for the left eye of the user and a second series of images for the right eye of the user. Each image of the first series and the second series may represent a section or portion of a scene displayed on the first display. In this case, the second display comprises a left display for displaying the series of images to the left eye and a right display for displaying the second series of images to the right eye. In this case, a line of view may be determined for each eye of the user and the first and second series of images are generated as a function of the line of view of the respective eye to which they are associated.

It should be understood that when the third set of images comprise stereoscopic images, the augmented reality images are also stereoscopic. In this case, the video images may comprise a first set of video images corresponding to what is being seen by the left eye of the user and a second set of video images corresponding to what is being seen by the right eye of the user. In another example, a single camera may be used to generate a single set of video images and the video images for the left and right eyes may be obtained by a extracting a respective portion of the video images contained in the single set.

In one embodiment, the method 10 further comprises tracking the line of view of the user or the users if the simulator is configured for training more than one user. In one embodiment, the position and orientation of the head of the user is tracked and the line of view is determined using the position and orientation of the head of the user.

In one embodiment, the step 22 of selectively and partially obstructing the field of view of the user is performed by synchronizing a shutter device with the sequential display of the first and second sets of images, as described in more detail below. In one embodiment, only the far peripheral vision of the user is selectively blocked at step 22.

Figure 2:
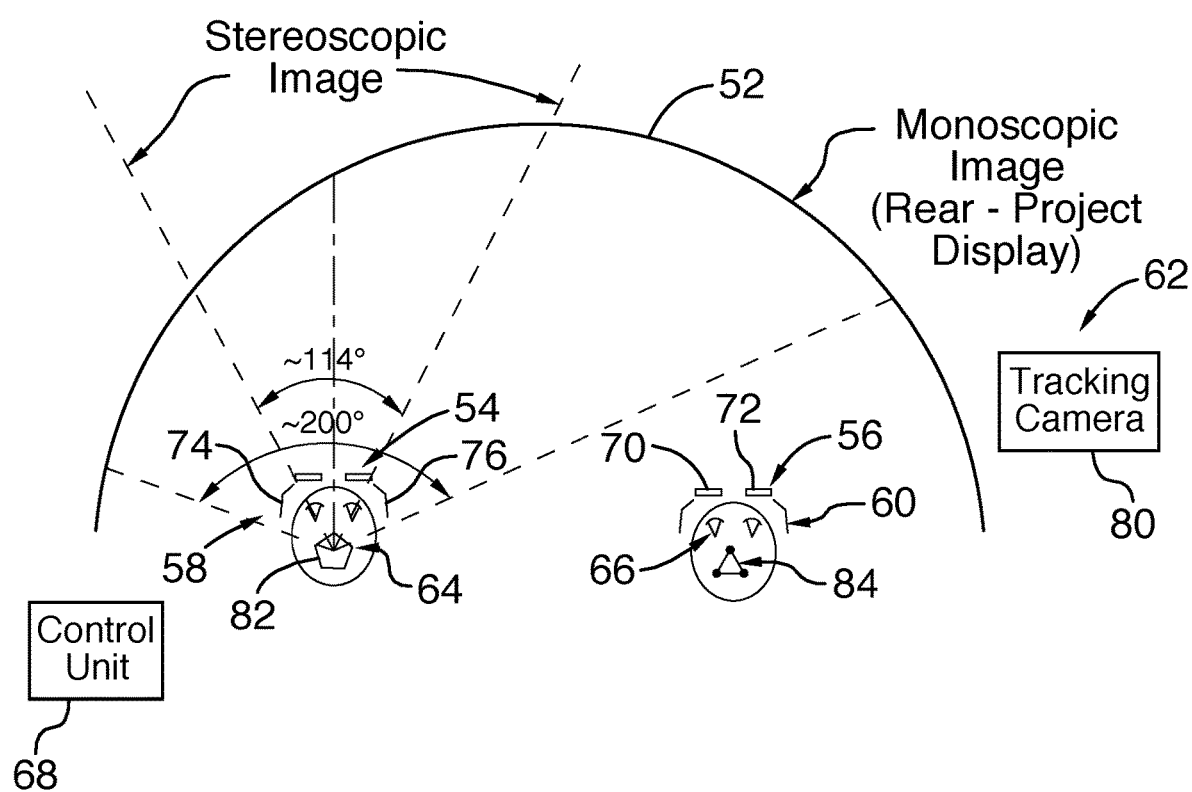
FIG. 2 is a block diagram of a simulator comprising a system for displaying images to two users, the system comprising two wearable displays for displaying thereon augmented reality images obtained using images captured by cameras, in accordance with an embodiment.

FIG. 2 illustrates one embodiment of a simulator 50 for concurrently training two users such as a pilot and a copilot of an aircraft for example. The simulator 50 comprises a first or main display 52, a wearable display 54, 56 for each user, a wearable shutter device 58, 60 for each user, a tracking system 62, a video camera 64, 66 for each user and a control unit 68. The simulator 50 further comprises physical elements (not shown) such as a frame, walls, a control panel, control instruments, etc.

In the illustrated embodiment, the main display 52 comprises a curved rear projection screen and at least one projector (not shown) for projecting monoscopic images on the rear projection screen. However, it should be understood that any adequate display for displaying monoscopic images may be used. For example, the main display 52 may be a dome for front projection, an LED screen or the like.

As illustrated in FIG. 2, the display 52 is positioned away from the users for filling the monocular field of views (peripheral vision) for the two users having a different point of view when looking at the display 52.

In the illustrated embodiment, the wearable display 54, 56 is integrated on a head mountable device to form a head mounted display, Each wearable device 54, 56 comprises a left display 70 positionable adjacent and in front of a left eye of the user and a right display 72 positionable adjacent and in front of a right eye of the user. The two displays 70 and 72 allow displaying stereoscopic images to the user. While the present description refers to a wearable display provided with a left and a right displays, it should be understood that any adequate wearable display configured for displaying stereoscopic images may be used.

It should be understood that the wearable displays 54 and 56 may be replaced by a single wearable display of which the screen is divided into two sections, each for displaying a respective image in front of a respective eye.

The shutter device 58, 60 is configured for at least partially selectively blocking the field of view of the user that is outside of the wearable display 54, 56. For example, the wearable display 54, 56 may be positioned to cover the central portion of the field of view of the user such as a 114° field of view while the shutter device 58, 60 may comprise two shutters 74 and 76 each positioned on a respective side of the user head and adjacent to a respective display 70, 72. The two shutters 74 and 76 allow selectively blocking the portion of the field of view of the user that is located outside of the central portion of the field of view and covered by the display 70, 72.

In an embodiment in which the displays 70 and 72 are part of a head mounted display, the shutter device 58, 60 may be mounted on the head mounted display.

In one embodiment, the shutter devices 58, 60 and/or the shutters 74 and 76 may comprise a liquid crystal shutter (LCS). The LCS can be operated so as to be substantially transparent to allow the user to see the display 52 or substantially opaque so as to prevent the user from seeing the display 52. However, it should be understood that any device adapted to selectively and partially block the field of view of a user so as selectively allow the user to see the main display 52 and prevent the user from seeing the display 52 may be used.

In one embodiment, the shutter devices 58 and 60 may be replaced by passive filters such as polarized glasses. In this case, the images of the first set have a first polarization and the images of the second set have a second and different polarization. The polarization of the polarized glasses of each user is different and determined according to the polarization of the respective images that they allow seeing. The polarization of the images of the first set is chosen as a function of the polarization of the polarized glasses for the first user (who will look at the display 52 according to the first point of view) and the polarization of the polarized glasses for the second user so that when the images of the first set are displayed on the main display 52, the first user may see the images of the first set displayed on the main display 52 through his polarized glasses while the second user cannot see the images of the first set displayed on the main display 52 through his polarized glasses. Similarly, the polarization of the images of the second set is chosen as a function of the polarization of the polarized glasses for the second point of view and the polarization of the polarized glasses for the second user (who will look at the main display according to the second point of view) so that when the images of the second set are displayed on the main display 52, the second user may see the images of the second set displayed on the main display 52 through his polarized glasses while the first user cannot see the images of the second set displayed on the main display 52 through his polarized glasses. In one embodiment, the first and second sets of images are displayed sequentially on the main display 52 similarly to when shutters devices 58 and 60 are used. In another embodiment, the first and second sets of images having different polarization are displayed concurrently on the main display 52

As described above, the simulator 50 comprises a tracking system 62 for tracking the line of view of each user. In the illustrated embodiment, the tracking system 62 comprises a tracking camera 80 and a head tracker 82, 84 positionable on the head the user. The tracking camera 80 along with the head tracker 82, 84 allows determining the position and the orientation of the head of the user, from which the line of view of the user may be determined. When the display 54, 56 is part of a head mounted display, the head tracker 82, 84 can be mounted on the head mounted display.

It should be understood that any adequate tracking system or device adapted to track the line of view of a user or the position and orientation of the head of a user may be used. For example, AC magnetic tracking system, DC magnetic tracking system, ultrasonic tracking system, inertial sensors tracking system, texture-based, infrared camera tracking system, inside-out camera tracking, system mechanical linkage tracking system or the like can be used The camera 64, 66 is mountable on the head of the user so as to capture video images of what the user is seeing. For example, the camera 64, 66 may be mounted on a head mounted display, if any. In one embodiment, the camera 64, 66 is a dual camera, i.e. it comprises a left camera positioned so as to capture the images as seen by the left eye of the user and a right camera positioned so as to capture the images as seen by the right eye of the user.

The control unit 68 comprises at least one processor or processing unit, a memory or storing unit and a communication unit for transmitting and/or receiving data. is configured for executing the steps of the method 10.

The control unit 68 receives a first set of images to be displayed on the main display 52 for the first user and a second set of images to be displayed for the second user also on the main display 52. In one embodiment, the images of the first set represents a scene according to the point of view of the first user while the images of the first set represents the same scene according to the point of view of the second user. For example, the scene may correspond to the outside of a vehicle to be simulated as seen through a window of the vehicle. In another embodiment, the images of the first and second sets may represent different scenes so different scenes be displayed to the two users on the same display 52.

In one embodiment, the control unit 68 is configured for receiving simulation data and generate the first and second sets of images. The images of the first set may be generated according to the point of view of the first user and the images of the second set may be generated according to the point of view of the second user. The point of view of each user may be predefined. Alternatively, the point of view of each user may be determined according to the position of the head of each user as detected by the tracking unit XX and any other adequate position tracking device. In this case, the point of view may be determined only once at the beginning of the simulation and all of the images of the first and second sets are generated according to the determined points of view. In another example, the point of view of each user may change during the simulation and the generation of the images of the first and second sets is performed using the changing points of view.

The control unit 68 further receives a third set of images for the first user and a fourth set of images for the second user. Each image of the third set corresponds to a section or portion of a corresponding image in the first set, which is determined as a function of the line of view of the first user. Similarly, each image of the fourth set corresponds to a section or portion of a corresponding image in the second set which is determined as a function of the line of view of the first user. The line of view is tracked substantially continuously.

As described above, the third set of images may comprises images generated according to the line of view of the left eye of the first user and images generated according to the line of view of the right eye of the first user. Similarly, the fourth set of images may comprises images generated according to the line of view of the left eye of the second user and images generated according to the line of view of the right eye of the second user In one embodiment, the control unit 68 is further configured for generating the third set of images and the fourth set of images. In this case, the images of the third set may be generated from the images of the first set and the images of the fourth set may be generated from the images of the second set. Alternatively, the images of the third and fourth sets may be generated from the simulation data.

The control unit 68 is further configured for generating the augmented reality images to be displayed on the display 54 of the first user and the display 56 of the second user. Regarding the first user, the control unit 68 combines together in real time the video images coming from the camera 64 and the images of the third set to obtain augmented reality images which are transmitted to the display 54 to be displayed thereon. Similarly, regarding the second user, the control unit 68 combines together in real time the video images coming from the camera 66 and the images of the fourth set to obtain augmented reality images which are transmitted to the display 56 to be displayed thereon.

In an embodiment in which the display 54, 56 comprises a left display 70 and a right display 72, it should be understood that augmented reality images are received or generated for both the left display 70 and the right display 72, for each display 54, 56.

The control unit 68 is further configured for sequentially displaying the first and second sets of images on the display 52 concurrently to displaying the augmented reality images on the displays 54 and 56. The control unit 68 is further adapted to control the wearable shutter device 58 and 60 synchronously with the sequential display of the images of the first and second sets. As described above, the images of the first and second sets are sequentially displayed on the display 52. During the display of images of the first set on the display 52, the control unit 68 opens the shutter device 58 while closing the shutter device 60 of the second user. During the display of images of the second set on the display 52, the control unit 68 closes the shutter device 58 while opening the shutter device 60 of the second user. As a result, when images of the first set are displayed on the display 52, the second user is prevented from seeing the images displayed on the display 52 and may only see the augmented reality images displayed on the display 56 while the first user may see both the images displayed on the display 52 and the augmented reality images displayed on the display 54. When images of the second set are displayed on the display 52, the first user is prevented from seeing the images displayed on the display 52 and may only see the augmented reality images displayed on the display 54 while the second user may see both the images displayed on the display 52 and the augmented reality images displayed on the display 54.

Figure 3:
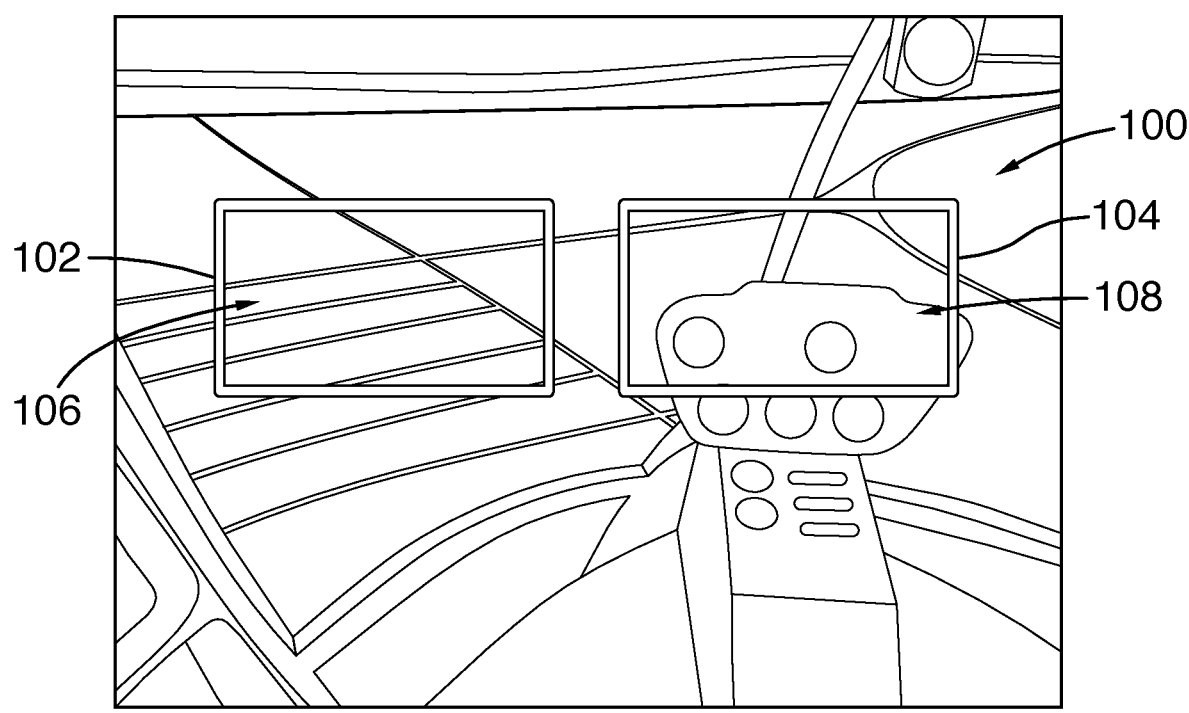
FIG. 3 is an exemplary scene as seen by a user of the simulator of FIG. 2, in accordance with an embodiment.

FIG. 3 illustrates an exemplary of what a user sees while using a display system such as the display system 50. A 2D image 100 is a scene is displayed on a main display located away from the user. The user is provided with a left wearable display 102 positioned in front of his left eye and a right wearable display 104 positioned in front of his right eye. A respective augmented reality image 106, 108 is displayed on the left and right displays 104 and 106 to provide a 3D image to the user. Each augmented reality image corresponds to what the respective eye would see if the respective display 102, 104 would not be positioned in front of the respective eye. For example, the image 106 corresponds to the portion of the image 100 that the left eye of the user would see if the display 102 would not be present. The image 108 corresponds to the combination of a portion of the image 100 and a portion of a video image captured by a camera. More precisely, the section of the video image which corresponds to the main display is replaced by an image representing the portion of the image 100 that the right eye of the user would see if the display 104 would not be present.

In the exemplary embodiment illustrated in FIG. 3, the image 100 is generated according to the point of view of the user and the shutter device (not shown) is open when the image 100 is displayed on the main display so that the user wearing the displays 102 and 104 may see his environment outside of the displays 102 and 104 including the image 100 displayed on the main display. It should be understood that the shutter device of the other user is closed when the image 100 is displayed on the main display so that the second user may only see the augmented reality images displayed on his left and right displays when the image 100 is displayed on the main display. On the contrary, when an image generated according to the point of view of the second user is displayed on the main display, the shutter device of the first user is closed and the shutter device of the second user is open so that only the second user may see the main display.

In one embodiment, the simulated images used for generating the augmented images 106 and 108 have a resolution or a quality as perceived by the user which is greater than the resolution or quality as perceived by the user of the 2D image 100 displayed on the main display.

In one embodiment, the images of the first and second sets are 2D images and the display 52 is a large field of view display to fill the peripheral vision for two different points of view. The images of the first set are generated according to the point of view of the first user while the images of the second set are generated according to the point of view of the second user.

In one embodiment, the display 52 comprises a rear projection screen and at least one projector for projecting images on the rear face of the rear projection screen to reduce the physical footprint of the display 52.

Figure 4:
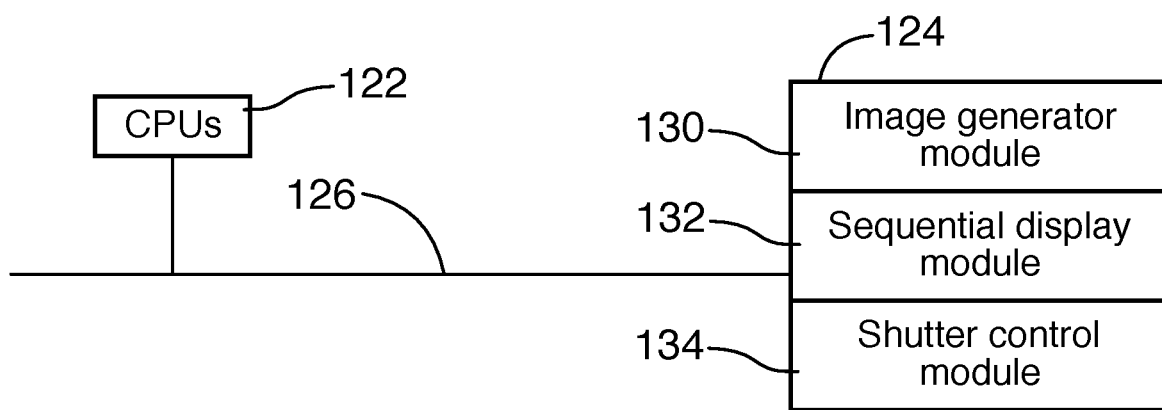
FIG. 4 block diagram of a processing module adapted to execute at least some of the steps of the method of FIG. 1, in accordance with an embodiment.

In one embodiment, the above described method and system allow reducing or eliminating parallax error for both users, and providing the two users with motion parallax cues. This may be achieved by combining the high resolution of a head-tracked helmet mounted display (HMD) to display 3D high resolution augmented reality images and cover the binocular field of view of the users, e.g. the central vision of the users, with the wide field of view of an electronically collimated display:

FIG. 4 is a block diagram illustrating an exemplary processing module 120 for executing the steps 12 to 22 of the method 10, in accordance with some embodiments. The processing module 120 typically includes one or more Computer Processing Units (CPUs) and/or Graphic Processing Units (GPUs) 122 for executing modules or programs and/or instructions stored in memory 124 and thereby performing processing operations, memory 124, and one or more communication buses 126 for interconnecting these components. The communication buses 126 optionally include circuitry (sometimes called a chipset) that interconnects and controls communications between system components. The memory 124 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 124 optionally includes one or more storage devices remotely located from the CPU(s) 122. The memory 124, or alternately the non-volatile memory device(s) within the memory 124, comprises a non-transitory computer readable storage medium. In some embodiments, the memory 124, or the computer readable storage medium of the memory 124 stores the following programs, modules, and data structures, or a subset thereof:

an augmented reality image generator module 130 for generating augmented reality images and displaying the generated augmented reality images on the respective wearable display of each user;

a sequential display module 132 for sequentially sequentially displaying the first and second sets of images on a main display located away from the users; and a shutter control module 134 for synchronizing the shutters of the users with the sequential display of the images on the main display.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 124 may store a subset of the modules and data structures identified above. Furthermore, the memory 124 may store additional modules and data structures not described above.

Although it shows a processing module 120, FIG. 4 is intended more as functional description of the various features which may be present in a management module than as a structural schematic of the embodiments described herein. In practice, and as recognized by those of ordinary skill in the art, items shown separately could be combined and some items could be separated.

Figure 5:
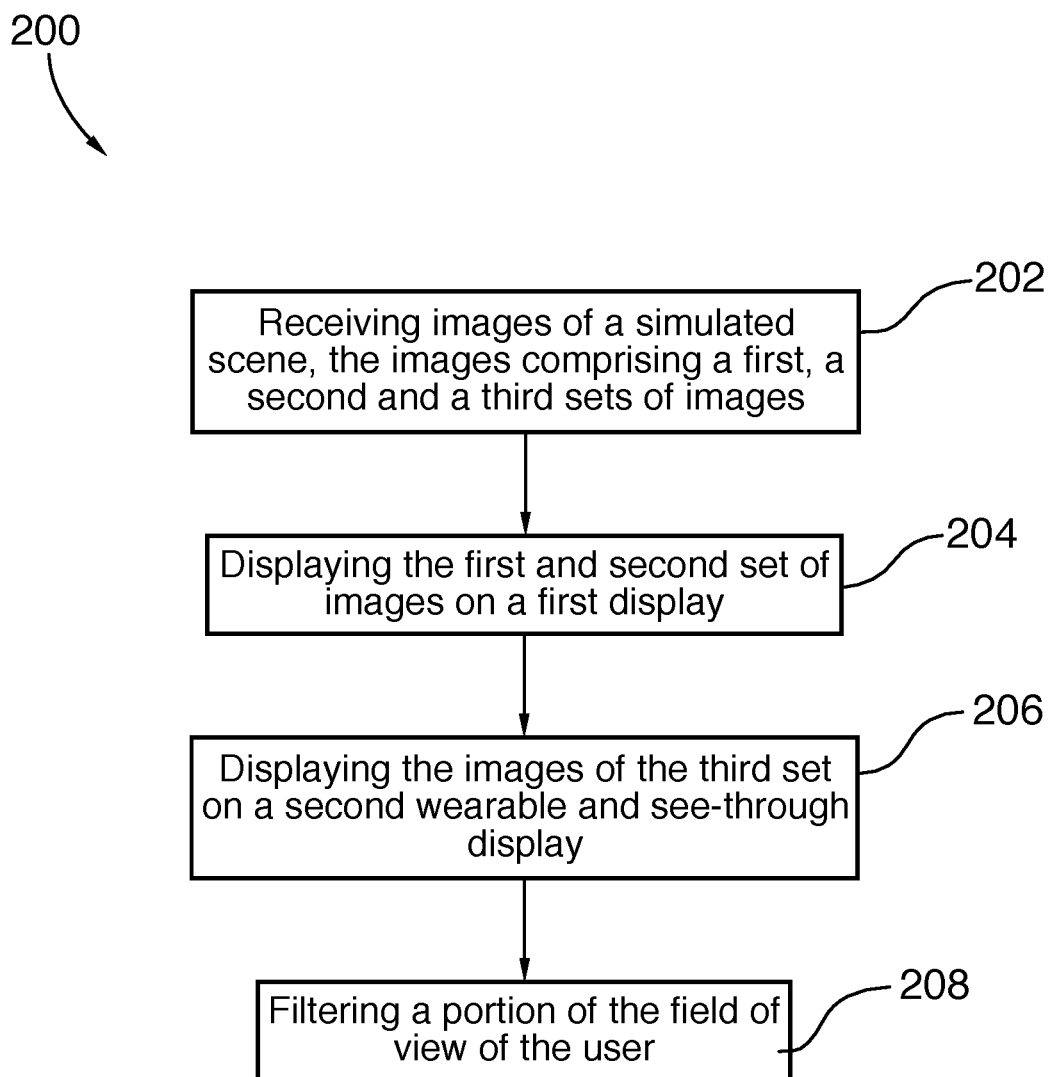
FIG. 5 is a flow chart of a method for displaying images in a simulator system comprising a wearable see-through display, in accordance with an embodiment.

While the above description refers to a method and system in which at least one camera is used for capturing images of the environment surrounding the main display 52 present within the field of view of the user. FIG. 5 illustrates one embodiment of a method 200 for displaying images on a main display such as display 52 while using no camera. In this case, the user wears a see-through display which allows him to see the environment surrounding the main display 52 through the see-through display 52.

The method 200 is executed by a computer machine provided with at least one processor or processing unit, a memory and communication means.

At step 202, scene images, i.e. images of a scene to be displayed to a user, are received. The scene images offer a representation of the simulation environment to be displayed to the user(s) of the simulator. For example, the scene images may be simulated images representing what a pilot of an aircraft would see while flying.

The scene images comprise three sets of images. As described above, it should be understood that a set of images comprises images which are timely ordered so as to be displayed according to a temporal order to form a video.

In one embodiment, the three sets of images comprise images of a same scene. For example, the first set of images comprises images of a scene suitable for being seen according to a first point of view, e.g. the point of view of a pilot. The second set of images comprises images of the same scene suitable for being seen according to a second and different point of view, e.g. the point of view of a copilot. The third set of images comprises images of at least a portion or section of the scene.

It should be understood that the third set of images may also comprise images different from the first and second sets of images.

In another embodiment, the third set of images may comprise two sets of images, i.e. a set of images according to the line of view of the left eye of the user and a further set of images according to the line of the right eye of the user.

As described above, the first and second sets of images may comprise images of different scenes.

In one embodiment, an image of the third set is a portion of a corresponding image of the first or second set. For example, an image of the first set may represent a scene and an image of the third set may represent a portion or section of the same scene as it would be seen through the see-through display and according to a given point of view. In an embodiment in which the third set of images comprises images for the left eye and the right eye, the third set of images comprises a set of images of the scene or a portion of the scene according to the point of view of the left eye and a set of corresponding images of the scene or a portion of the scene according to the point of view of the right eye.

In one embodiment, the first and second sets of images comprise monoscopic images. In the same or another embodiment, the third set of images comprises stereoscopic images.

In an embodiment in which the simulator is configured for training two users, the third set of images comprises two sets of images each for a respective user.

At step 204, the first and second sets of images are displayed on a first or main display. In one embodiment, the first and second sets of images are concurrently displayed on the first display. In another embodiment, the first and second sets of images are sequentially displayed on the first display, i.e. images of the first set and images of the second set are displayed on the first display in an alternating manner, as described above. For example, at least a first image of the first set may be displayed during a first period of time, then at least a first image of the second set is displayed during a second period of time, then at least a second image of the first set is displayed during a third period of time, at least a second image of the second set is subsequently displayed during a fourth period of time, etc. In one embodiment, the period of time during which an image of the first set is displayed is equal to the period of time during which an image of the second set is displayed.

At step 206, the third set of images is displayed on a second see-through display concurrently to the sequential display of the first and second sets of images on the first display. As described below, the see-through display is wearable so as to be adjacent to the eyes of the user. the images of the third set represent the portion of the scene displayed on the main display as seen through the see-through display.

In an embodiment in which the simulator is configured for training two users, two sets of third sets of images are generated and each third set of images is displayed on a respective see-through display for a respective user.

At step 208, a portion of the field of view of the user is filtered using an optical filter. The optical filter may be an active filter such as a shutter device. Alternatively, the optical filter may be a passive filter such as a polarization filter or a wavelength filter.

In an embodiment in which an active filter such as a shutter device is used, the portion of the field of view of the user is selectively blocked and the step 204 comprises sequentially displaying the first and second sets of images on the first display. The blocking of the portion of the field of view of the user is synchronized with the sequential display of the first and second sets of images. In one embodiment, the blocking of the field of view is synchronized with the display of the second set of images so that the field of view of the user is partially blocked while images of the second set are displayed. As a result, the whole field of view of the user is clear/unblocked when images of the first set are displayed. In another embodiment, the blocking of the field of view is synchronized with the display of the first set of images so that the field of view of the user is partially blocked when images of the first set are displayed. As a result, the whole field of view of the user is clear/unblocked when images of the second set are displayed. It should be understood that the images of the third set may be continuously displayed independently of the type of images displayed on the main display.

In an embodiment in which passive filtering is performed at step 208, the first and second sets of images are concurrently displayed on the first display at step 204. In one embodiment, polarization is filtered. In this case, the images of the first set have a first polarization while the images of the second set have a second and different polarization. The light coming from the portion of the field of view of the user is filtered so that only the light having the first polarization may reach the user's eyes and only the images of the first set may be seen by the user.

When the simulator is used for training two users, the light coming from the portion of the field of view of the first user is filtered so that only the light having the first polarization may reach the first user's eyes and only the images of the first set may be seen by the first user. Similarly, the light coming from the portion of the field of view of the second user is filtered so that only the light having the second polarization may reach the second user's eyes and only the images of the second set may be seen by the second user.

In another embodiment, wavelength is filtered. In this case, the images of the first set have a first range of wavelength associated thereto while the images of the second set have a second and different range of wavelength associated thereto. The light coming from the portion of the field of view of the user is filtered so that only light having a wavelength contained in the first range of wavelength may reach the user's eyes and only the images of the first set may be seen by the user.

When the simulator is used for training two users, the light coming from the portion of the field of view of the first user is filtered so that only light having a wavelength contained in the first range of wavelength may reach the first user's eyes and only the images of the first set may be seen by the first user. Similarly, the light coming from the portion of the field of view of the second user is filtered so that only light having a wavelength contained in the second range of wavelength may reach the second user's eyes and only the images of the second set may be seen by the second user.

In one embodiment, the method 200 further comprises receiving simulation data and generating the first and second sets of images using the simulation data, as described above.

Similarly, the method 200 may comprise a step of generating the third set of images for the user or each user when the simulator is configured for training more than one user. In this case, the third set of images is generated using the simulation data and the line of view of the user. In one embodiment, the images of the third set are generated by determining the line of view of the user and determining which portion of the main display is viewed by the user through the see-through display. The determination of the portion of the main display that is seen through the see-through display may be determined based on the position of the user head or the position of the see-through display, the orientation of the head of the user and the dimensions of the see-through display. The images of the third set then corresponds to the portion of the scene that is to be concurrently displayed on the determined portion of the main display and the images are generated as a function of the point of view of the user. Therefore, when the user cannot see any portion of the main display, no image is displayed on the see-through display.

In one embodiment, the third set of images comprises stereoscopic images. In this case, the third set of images may comprise a first series of images for the left eye of the user and a second series of images for the right eye of the user. Each image of the first series and the second series may represent a section or portion of a scene displayed on the first display. In this case, the second display comprises a left display for displaying the series of images to the left eye and a right display for displaying the second series of images to the right eye. In this case, a line of view may be determined for each eye of the user and the first and second series of images are generated as a function of the line of view of the respective eye to which they are associated.

It should be understood that the first, second and third sets of images used in the method 200 may be the same as those used for the method 10.

In one embodiment, the method 200 further comprises tracking the line of view of the user or the users if the simulator is configured for training more than one user. In one embodiment, the position and orientation of the head of the user is tracked and the line of view is determined using the position and orientation of the head of the user.

In one embodiment, the step 208 of selectively and partially obstructing the field of view of the user is performed by synchronizing a shutter device with the sequential display of the first and second sets of images, as described in more detail below. In one embodiment, only the far peripheral vision of the user is selectively blocked at step 208. In another embodiment, at least the far peripheral vision of the user is selectively blocked at step 208.

Figure 6:
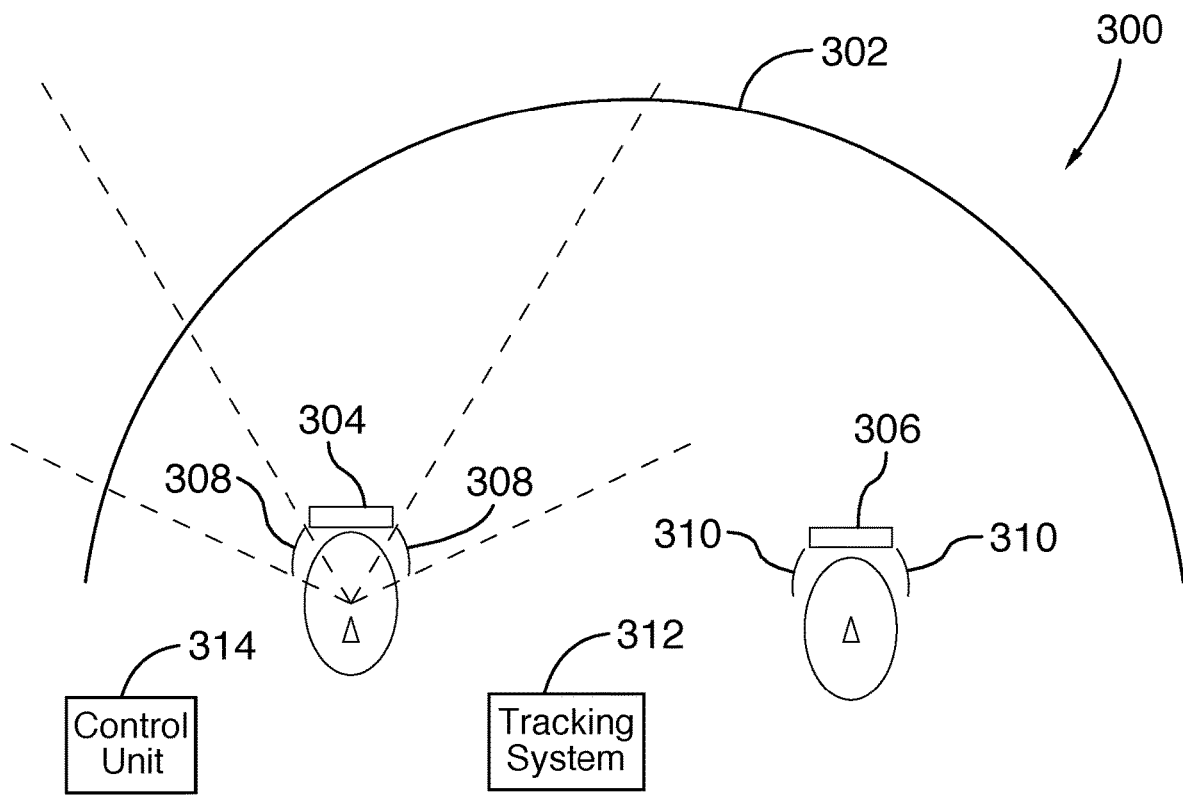
FIG. 6 is a block diagram of a simulator comprising a system for displaying images to two users, the system comprising two wearable see-through displays, in accordance with an embodiment.
Figure 7:
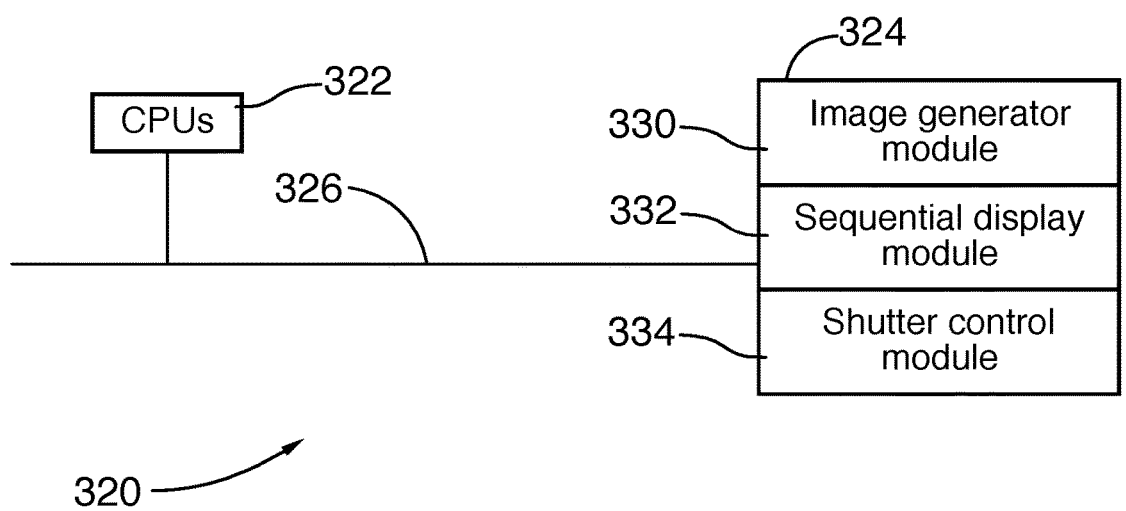
FIG. 7 block diagram of a processing module adapted to execute at least some of the steps of the method of FIG. 5, in accordance with an embodiment.

FIG. 6 illustrates one embodiment of a simulator system 300 for executing the method 200. In this case, the simulator system 300 comprises no camera such as cameras 64, 66 for recording the field of view of the users. The simulator system 300 comprises a main display 302, a wearable display 304, 306 which is see-through for each user, a wearable filter 308, 310 for each user, a tracking system 312 and a control unit 314. The simulator system 3200 further comprises physical elements (not shown) such as a frame, walls, a control panel, control instruments, etc.

The see-through display device 304, 306 may be integrated on a head mountable device to form a head mounted display. Each see-through device 304, 306 may comprise a single display sized and shaped for covering both eyes of a user, as illustrated in FIG. 6. In this case, a single image may be displayed on the single see-through screen 304, 306. Alternatively, the see-through screen 304, 306 may be divided into two sections, i.e. a left section and a right section. In this case, a corresponding image of the third set is displayed on each one of the left and right sections of the see-through display 304, 306.

In another embodiment, the see-through display 304, 306 may comprise a left see-through screen positionable adjacent and in front of a left eye of the user and a right see-through screen positionable adjacent and in front of a right eye of the user. The two see-through screens allow displaying stereoscopic images to the user.

As described above, each wearable filter 308, 310 is adapted to at least partially filter the field of view of the respective user outside of the respective see-through display device 304, 306. In one embodiment, the filters 308 and 310 are active filters such as shutters. In another embodiment, the filters 308 and 310 are passive filters. For example, the passive filters may be polarized glasses. In another example, the passive filters may be wavelength filters.

In an embodiment in which the see-through display device 304 and 306 are part of a head mounted display, the filter 308, 310 may be mounted on the head mounted display.

The control unit 314 is configured for receiving the first, second and third sets of images and displaying the first and second sets of images on the main display 302 while displaying the third set of images on the see-through display device 304, 306, as described above.

In an embodiment in which the filters 308 and 310 are passive filters, the control unit 314 may be adapted to concurrently display the first and second sets of images on the main display 302. In an embodiment in which the filters 308 and 310 are active filters, the control unit 314 may be adapted to sequentially display the first and second sets of images on the main display 302.

In one embodiment, the control unit 314 may be configured for generating the first and second sets of images and/or generating the third set of images, as described above.

It should be understood that when the wearable display 304, 306 is see-through, the control unit 314 is not configured for generating augmented reality images since the simulator comprises no camera. The control unit 314 simply displays the images of the third set on the see-through display 304, 306 without combining them with images captured by a camera.

In one embodiment such as an embodiment in which the filters 308 and 310 are shutters, it should be understood that the control unit 314 is configured for sequentially displaying the first and second sets of images on the display 302 concurrently to displaying the images of the third set on the see-through displays 304 and 306. The control unit 314 is further adapted to control the wearable shutter devices 308 and 310 synchronously with the sequential display of the images of the first and second sets. As described above, the images of the first and second sets are sequentially displayed on the display 302. During the display of images of the first set on the display 302, the control unit 314 opens the shutter device 308 while closing the shutter device 310 of the second user. During the display of images of the second set on the display 302, the control unit 314 closes the shutter device 308 while opening the shutter device 310 of the second user. As a result, when images of the first set are displayed on the display 302, the second user is prevented from seeing the images displayed on the display 302 and may only see the augmented reality images displayed on the display 306 while the first user may see both the images displayed on the display 302 and the augmented reality images displayed on the display 304. When images of the second set are displayed on the display 302, the first user is prevented from seeing the images displayed on the display 302 and may only see the augmented reality images displayed on the display 304 while the second user may see both the images displayed on the display 302 and the augmented reality images displayed on the display 304.

The embodiments of the invention described above are intended to be exemplary only. The scope of the invention is therefore intended to be limited solely by the scope of the appended claims.

We claim:

1. A display system for a simulator, the display system comprising:
    a main display for displaying a simulated scene, the first display being positionable away from a user;
    a see-through display for displaying a portion of the simulated scene, the see-through display being wearable by the user;
    a filter for filtering a portion of a field of view of the user; and
    a control unit configured for:
        receiving environment images, the environment images comprising a first set of images of the simulated scene, a second set of images of the simulated scene and a third set of images of at least a portion of the simulated scene;
        displaying the first and second set of images on the first display; and
        displaying the third set of images on the see-through display.

2. The display system of claim 1, wherein the first set of images comprises images of the simulated scene according to a first point of view and the second set of images comprises images of the simulated scene according to a second and different point of view.

3. The display system of claim 1, wherein the control unit is further configured for receiving simulation data and generating the first and second sets of images using the received simulation data.

4. The display system of claim 3, further comprising a tracking unit configured for tracking the line of view of the user.

5. The display system of claim 1, wherein the see-through display is configured for displaying stereoscopic images.

6. The display system of claim 1, wherein the main display is configured for displaying monoscopic images.

7. The display system of claim 1, wherein:
    the filter comprises a shutter device wearable by the user, the shutter device being adjacent to the see-through display when worn by the user, the shutter device being configured for selectively obstructing a portion of a field of view of the user; and
    the control unit is configured for sequentially displaying the first and second set of images on the first display and synchronizing the shutter device with the sequential display of the first and second set of images to selectively prevent the user from seeing at least a section of the first display during display of the second set of images on the first display.

8. The display system of claim 1, wherein the filter is a passive filter.

9. The display system of claim 8, wherein the passive filter comprises a polarization glass device for allowing the user to see images having a given polarization, the first set of images having the given polarization and the second set of images having a polarization different from the given polarization for preventing the user from seeing the second images through the polarization glass device.

10. The display system of claim 8, wherein the passive filter comprises a wavelength filter device for allowing the user to see images having a given wavelength range, the first set of images having the given wavelength range and the second set of images having a wavelength range different form the given wavelength range for preventing the user from seeing the second images through the wavelength filter device.

11. A computer-implemented method for displaying images in a simulator, the computer-implemented method comprising:
receiving scene images of a simulated scene, the scene images comprising a first set of images of the simulated scene, a second set of images of the simulated scene and a third set of images corresponding to at least a portion of the scene;
displaying the first and second set of images on a main display positioned away from a user;
displaying the third set of images on a see-through display, the see-through display being worn by the user; and
filtering a portion of a field of view of the user.

12. The computer-implemented method of claim 11, wherein the first set of images comprises images of the simulated scene according to a first point of view and the second set of images comprises images of the simulated scene according to a second and different point of view.

13. The computer-implemented method of claim 11, further comprising receiving simulation data and generating the first and second sets of images using the received simulation data.

14. The computer-implemented method of claim 13, further comprising tracking the line of view of the user.

15. The computer-implemented method of claim 11, wherein said displaying the third set of images comprises displaying stereoscopically the third set of images.

16. The computer-implemented method of claim 11, wherein said displaying the first and second set of images on the main display displaying monoscopically the first and second set of images.

17. The computer-implemented method of claim 11, wherein:
said displaying the first and second set of images on the first display comprises sequentially displaying the first and second set of images on the first display; and
said filtering the portion of the field of view of the user comprises selectively obstructing the portion of the field of view of the user in synchronization with the sequential display of the first and second sets of images, thereby selectively preventing the user from seeing at least a section of the first display during display of the second set of images on the first display.

18. The computer-implemented method of claim 17, wherein said selectively obstructing a portion of a field of view of the user is performed by synchronizing a shutter device with the sequential display of the first and second sets of images, the shutter device being worn by the user and adjacent to the see-through display.

19. The computer-implemented method of claim 11, wherein, the first set of images have a given polarization and the second set of images have a polarization different from the given polarization, said filtering comprising allowing the user to see the first set of images and preventing the user from seeing the second set of images.

20. The computer-implemented method of claim 11, wherein, the first set of images have a first wavelength bandwidth and the second set of images have a second wavelength bandwidth different from the first wavelength bandwidth, said filtering comprising allowing the user to see the first set of images and preventing the user from seeing the second set of images.

* * * * *